(12) United States Patent
So et al.

(10) Patent No.: US 11,950,755 B2
(45) Date of Patent: Apr. 9, 2024

(54) CHARGING STATION FOR ROBOT VACUUM CLEANER

(71) Applicant: Samsung Electronics Co., Ltd., Suwon-si (KR)

(72) Inventors: Jeayun So, Suwon-si (KR); Chunseong Kim, Suwon-si (KR); Hankyeol Kim, Suwon-si (KR); Jihye Seo, Suwon-si (KR); Sangsik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 17/252,181

(22) PCT Filed: May 10, 2019

(86) PCT No.: PCT/KR2019/005659
§ 371 (c)(1),
(2) Date: Dec. 14, 2020

(87) PCT Pub. No.: WO2019/240381
PCT Pub. Date: Dec. 19, 2019

(65) Prior Publication Data
US 2021/0267426 A1    Sep. 2, 2021

(30) Foreign Application Priority Data

Jun. 14, 2018  (KR) .................. 10-2018-0068036

(51) Int. Cl.
*A47L 9/28*    (2006.01)
*A47L 9/30*    (2006.01)
(Continued)

(52) U.S. Cl.
CPC .......... *A47L 9/2873* (2013.01); *A47L 9/2894* (2013.01); *A47L 9/30* (2013.01); *G02B 5/10* (2013.01);
(Continued)

(58) Field of Classification Search
CPC ........ A47L 9/2873; A47L 9/2894; A47L 9/30; A47L 2201/022; G02B 5/10; G05D 1/0242; G05D 2201/0215
(Continued)

(56) References Cited

U.S. PATENT DOCUMENTS 6,364,506 B1    4/2002  Gallo
6,650,035 B2    11/2003 Matsudate
(Continued)

FOREIGN PATENT DOCUMENTS

AU    2013272382 B2    1/2015
CN    101297267 A  * 10/2008  ............. A47L 5/225
(Continued)

OTHER PUBLICATIONS

International Search Report dated Aug. 13, 2019 in connection with International Patent Application No. PCT/KR2019/005659, 2 pages.
(Continued)

*Primary Examiner* — Suresh Memula

(57) ABSTRACT

A charging station is disclosed. The disclosed charging station comprises: a charging member configured to come into contact with a charging terminal of a robot vacuum cleaner to provide power to the charging terminal; a first light emitting member for emitting an infrared signal; and a reflecting member disposed to face the first light emitting member and reflect an infrared signal emitted from the first light emitting member, toward the front and sides of the charging station.

12 Claims, 19 Drawing Sheets

(51) Int. Cl.
*G02B 5/10* (2006.01)
*G05D 1/00* (2006.01)
*G05D 1/02* (2020.01)

(52) U.S. Cl.
CPC ...... *G05D 1/0242* (2013.01); *A47L 2201/022* (2013.01); *G05D 2201/0215* (2013.01)

(58) Field of Classification Search
USPC .......................................................... 320/109
See application file for complete search history.

(56) References Cited

U.S. PATENT DOCUMENTS

| | | | |
|---|---|---|---|
| 6,993,775 | B2 | 1/2006 | Bae et al. |
| 7,332,890 | B2 | 2/2008 | Cohen et al. |
| 7,566,148 | B2 | 7/2009 | Noh et al. |
| 7,729,803 | B2 | 6/2010 | Lim et al. |
| 8,390,251 | B2 | 3/2013 | Cohen et al. |
| 8,461,803 | B2 | 6/2013 | Cohen et al. |
| 8,680,816 | B2 | 3/2014 | Li |
| 8,825,256 | B2 | 9/2014 | Kim et al. |
| 8,954,192 | B2 | 2/2015 | Ozick et al. |
| 9,550,294 | B2 | 1/2017 | Cohen et al. |
| 9,696,143 | B2 | 7/2017 | Lefebvre et al. |
| 9,826,873 | B2 | 11/2017 | Abe et al. |
| 10,094,411 | B2 | 10/2018 | Kostin |
| 2008/0231929 | A1 | 9/2008 | Desaulniers |
| 2010/0149434 | A1 | 6/2010 | Desaulniers |
| 2012/0086389 | A1 | 4/2012 | Li |
| 2012/0143428 | A1* | 6/2012 | Kim ............... G05D 1/0242 |
| | | | 701/23 |
| 2014/0036062 | A1* | 2/2014 | Yoon ................. G01V 8/10 |
| | | | 348/118 |
| 2017/0007256 | A1 | 1/2017 | Olson |
| 2017/0067498 | A1 | 3/2017 | Kostin |
| 2018/0014709 | A1 | 1/2018 | O'Brien et al. |
| 2018/0055325 | A1* | 3/2018 | Yoon ............... A47L 9/2852 |

FOREIGN PATENT DOCUMENTS

| | | | | |
|---|---|---|---|---|
| CN | 106814739 A | * | 6/2017 | ........... G05D 1/0214 |
| DE | 202009018985 U1 | * | 3/2015 | ........... A47L 9/2852 |
| DE | 212019000169 U1 | * | 1/2021 | ............. A47L 11/24 |
| EP | 2407077 A2 | * | 1/2012 | ........... A47L 9/0477 |
| JP | S46-41761 | | 9/1972 | |
| JP | S60-15931 A | | 1/1985 | |
| JP | S61-273606 A | | 12/1986 | |
| JP | 2000-292687 A | | 10/2000 | |
| JP | 2001-144644 A | | 5/2001 | |
| JP | 2002-160246 A | | 6/2002 | |
| JP | 3693329 B2 | | 9/2005 | |
| JP | 2023500082 A | * | 1/2023 | |
| KR | 20-0132992 Y1 | | 10/1998 | |
| KR | 10-0645381 B1 | | 11/2006 | |
| KR | 10-2007-0102844 A | | 10/2007 | |
| KR | 10-2008-0019588 A | | 3/2008 | |
| KR | 10-2008-0089447 A | | 10/2008 | |
| KR | 10-2010-0076186 A | | 7/2010 | |
| KR | 10-2012-0019437 A | | 3/2012 | |
| KR | 10-1146907 B1 | | 5/2012 | |
| KR | 10-2012-0140176 A | | 12/2012 | |
| KR | 10-2013-0034573 A | | 4/2013 | |
| KR | 10-2013-0097623 A | | 9/2013 | |
| KR | 20130127903 A | * | 11/2013 | |
| KR | 10-2013-0137536 A | | 12/2013 | |
| KR | 10-1353309 B1 | | 1/2014 | |
| KR | 10-2015-0059390 A | | 6/2015 | |
| KR | 10-2016-0136426 A | | 11/2016 | |
| KR | 10-1672787 B1 | | 11/2016 | |
| KR | 10-1719404 B1 | | 3/2017 | |
| KR | 10-1771869 B1 | | 8/2017 | |
| WO | WO-2019240381 A1 | * | 12/2019 | ............... A47L 9/28 |

OTHER PUBLICATIONS

Written Opinion of the International Searching Authority dated Aug. 13, 2019 in connection with International Patent Application No. PCT/KR2019/005659, 3 pages.

Request for the Submission of an Opinion dated Aug. 23, 2022 in connection with Korean Patent Application No. 10-2018-0068036, 13 pages.

* cited by examiner

CHARGING STATION FOR ROBOT VACUUM CLEANER

CROSS-REFERENCE TO RELATED APPLICATIONS

This application is a 371 of International Application No. PCT/KR2019/005659 filed on May 10, 2019, which claims priority to Korean Patent Application No. 10-2018-0068036 filed on Jun. 14, 2018, the disclosures of which are herein incorporated by reference in their entirety.

BACKGROUND

1. Field

This disclosure relates to a charging station with enhanced infrared signal emission efficiency and charging convenience.

2. Description of Related Art

A robot vacuum cleaner is a device for cleaning a certain area while moving without a separate operation of a user. A charging station is a device for charging the robot vacuum cleaner and is fixed at a predetermined position.

The charging station may include at least one infrared light emitting unit for emitting a signal for charging the robot vacuum cleaner. At least one infrared light emitting unit may emit a charging signal in a charging step of the robot vacuum cleaner and may emit a safe signal for preventing a collision between the robot vacuum cleaner and the charging station in a cleaning step of the robot vacuum cleaner.

When the safe signal is emitted to a region remote from the charging station, such as a charging signal, the robot vacuum cleaner cannot approach the charging stage, and there may be a region where the robot vacuum cleaner may not clean.

Thus, the safe signal should be emitted only to a certain region on the basis of the charging stage, unlike the charging signal.

The safe signal needs to be emitted at a wide angle, including a side with respect to the charging station, to prevent the robot vacuum cleaner from accessing the side of the charging station.

A related-art charging station emits a charging signal and a safe signal through a same infrared light emitter, there is a problem that the charging signal and the safe signal of a desired range cannot be simultaneously realized.

Due to a limitation on the range of the charging signal of the infrared light emitter, contact and alignment of the robot vacuum cleaner with the charging station may not be correct and there may be a problem that the robot vacuum cleaner is not charged.

SUMMARY

The purpose of the present disclosure is to provide a charging station with improved infrared signal emission efficiency and charging convenience through a structure for emitting an infrared signal and a new charging structure for a robot vacuum cleaner.

The disclosure provides a charging station which includes a charging member configured to come into contact with a charging terminal of the robot vacuum cleaner to provide power to the charging terminal, a first light emitting member for emitting an infrared signal, and a reflecting member disposed to face the first light emitting member and reflect an infrared signal emitted from the first light emitting member, toward front and sides of the charging station.

The disclosure provides a method of manufacturing a charging station including aligning a first light emitting member emitting an infrared signal in a receiving portion of a guide member into which the first light emitting member is inserted, communicating the first light emitting member with the receiving portion and inserting the light emitting member into the receiving portion through an insertion hole formed on a lower surface of the guide member; and coupling the first light emitting member to a fixing member formed on the guide member by rotating the first light emitting member in a predetermined direction.

The reflecting member may be in a conical shape, and a vertex of the reflecting member may be disposed to coincide with a central axis of the first light emitting member.

A reflecting surface of the reflecting member may comprise a cross-section crossing the central axis including broken line with slopes of a first slope and a second slope, wherein the broken line portion of the second slope located farther than the broken line portion of the first slope with respect to the first light emitting member and the second slope is greater than the first slope with respect to the central axis.

The charging station may further include a housing, a second light emitting member disposed vertically on a substrate coupled to an inside of the housing for emitting an infrared signal toward a front of the charging station, and a guide member disposed on a front of the second light emitting member for guiding a signal transmitted from the second light emitting member in a predetermined direction, and the first light emitting member may be received in the guide member.

The guide member may include a protrusion which protrudes along a front of the guide member and partitions an infrared signal emitted from a first light emitting member and an infrared signal emitted from a second light emitting member.

The guide member may include a receiving portion in which the first light emitting member is received, and the receiving portion may include a cover surface covering a portion of the first light emitting member.

The reflecting member may be integrally formed with a surface facing the first light emitting member of the protrusion.

The receiving portion may be connected to an insertion hole formed on a lower surface of the guide member, and the first light emitting member may be inserted into the receiving portion through the insertion hole.

The guide member may include a fixing member for fixing the first light emitting member to the receiving portion.

The charging member may include a charging terminal and a magnetic body.

The magnetic body may include an electromagnet, and the charging station further includes a processor for adjusting magnetization of the electromagnet by controlling current supplied to the electromagnet, and the processor is configured to, based on the robot vacuum cleaner being positioned adjacent to the charging member for charging, supply current to the electromagnet to magnetize the electromagnet, and based on charging of the robot vacuum cleaner being completed, stop supplying current to the electromagnet and remove magnetization of the electromagnet.

The reflecting member is in a polygonal shape, and a vertex of the reflecting member may be disposed to coincide with a central axis of the first light emitting member.

DETAILED DESCRIPTION

In order to fully understand the structure and effect of the disclosure, preferred embodiments of the disclosure are described with reference to the accompanying drawings. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the appended drawings, the components are exaggerated for ease of illustration, and the proportion of each component may be exaggerated or reduced.

It will be understood that, when an element is described as being "on" or "abutting" another element, there may be other elements in the middle, although it may be directly on or connected to the other element. In contrast, when an element is described as being "directly on" or "directly abutting" another element, there may be no intervening element. Other representations that describe a relationship between elements such as "between" and "directly between" may likewise be interpreted.

The terms first, second, or the like, may be used to describe various elements, but the elements should not be limited by these terms. These terms may only be used to distinguish one element from another. For example, a first element can be termed a second element, and similarly, a second element can be termed a first element without departing from the scope of the disclosure.

The expression of a singular includes a plurality of representations, unless the context clearly indicates otherwise. It is to be understood that the terms "comprises" or "having" or the like are intended to specify the presence of stated features, integers, steps, operations, components, parts, or combinations thereof, and that one or more other features or numbers, steps, operations, components, parts, or combinations thereof may be added.

The terms used in embodiments of the disclosure may be construed in a commonly known sense to one of ordinary skill in the art, unless otherwise defined.

Figure 1:
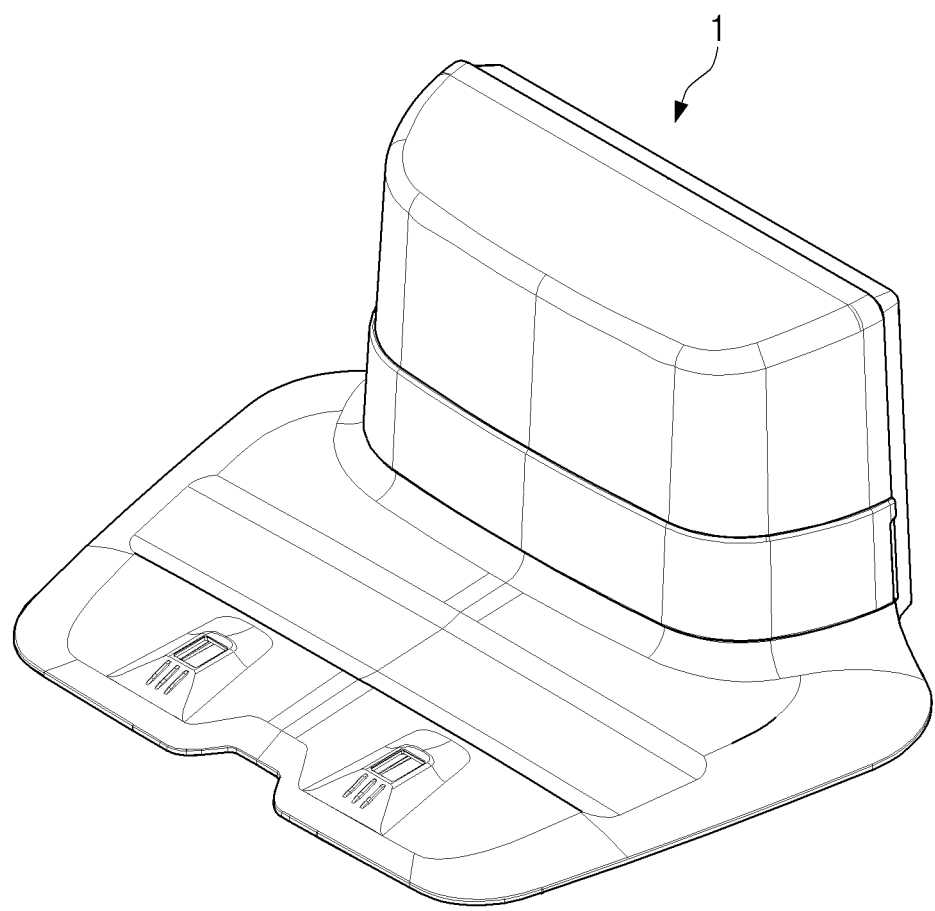
FIG. 1 is a perspective view illustrating a charging station according to an embodiment.
Figure 2:
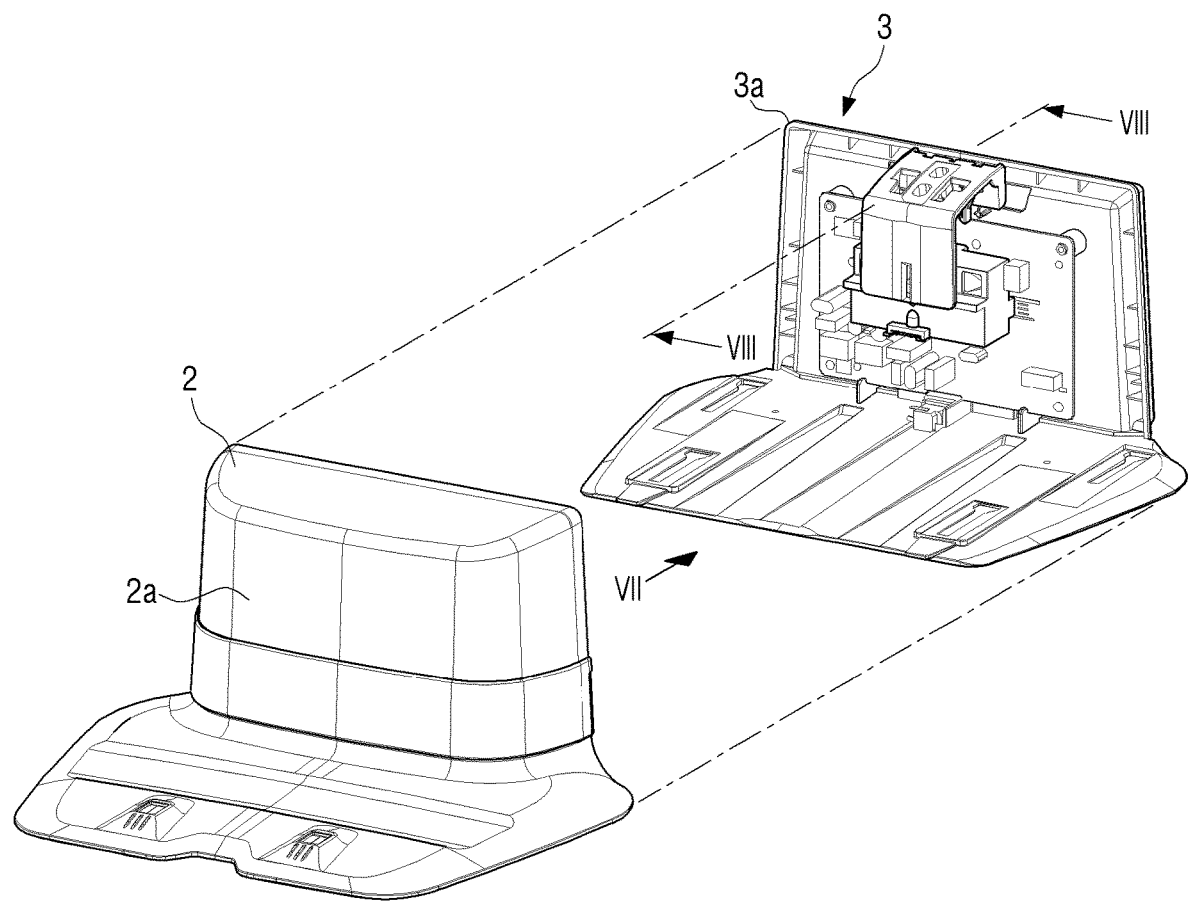
FIG. 2 is an exploded perspective view illustrating a cover and a main body.

FIG. 1 is a perspective view illustrating a charging station 1 according to an embodiment, and FIG. 2 is an exploded perspective view illustrating a cover 2 and a main body 3.

Figure 15:
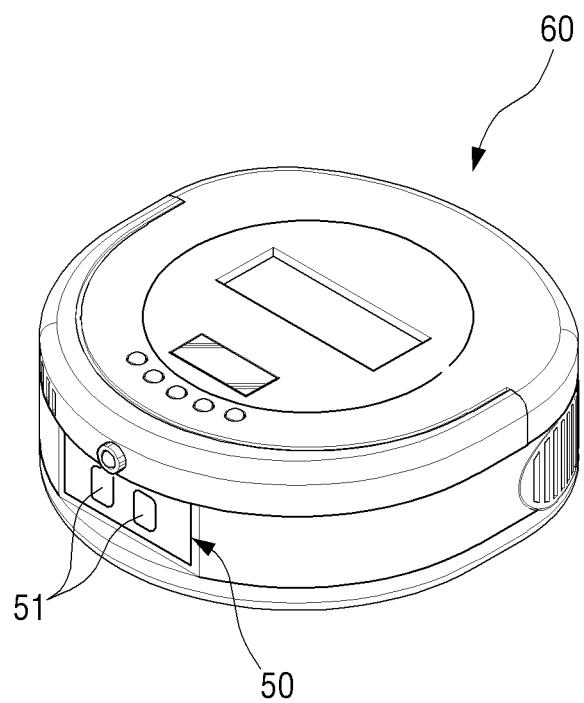
FIG. 15 is a perspective view in which a charging unit is coupled with a robot vacuum cleaner.

Referring to FIGS. 1 and 2, a charging station 1 according to one embodiment may include a body 3 that includes a cover 2 and various components for charging the robot vacuum cleaner 60 (see FIG. 15).

The cover 2 is detachably coupled to the main body 3, and may prevent external foreign substances from entering the main body 3. A front surface 2a of the cover 2 may be made of a material through which an infrared signal may pass and may be formed by injection molding if needed.

The main body 3 forms an appearance through a housing 3a, and includes several components for emitting an infrared signal and components for charging the robot vacuum cleaner 60. A specific configuration and structure of the main body 3 will be described below.

Figure 3:
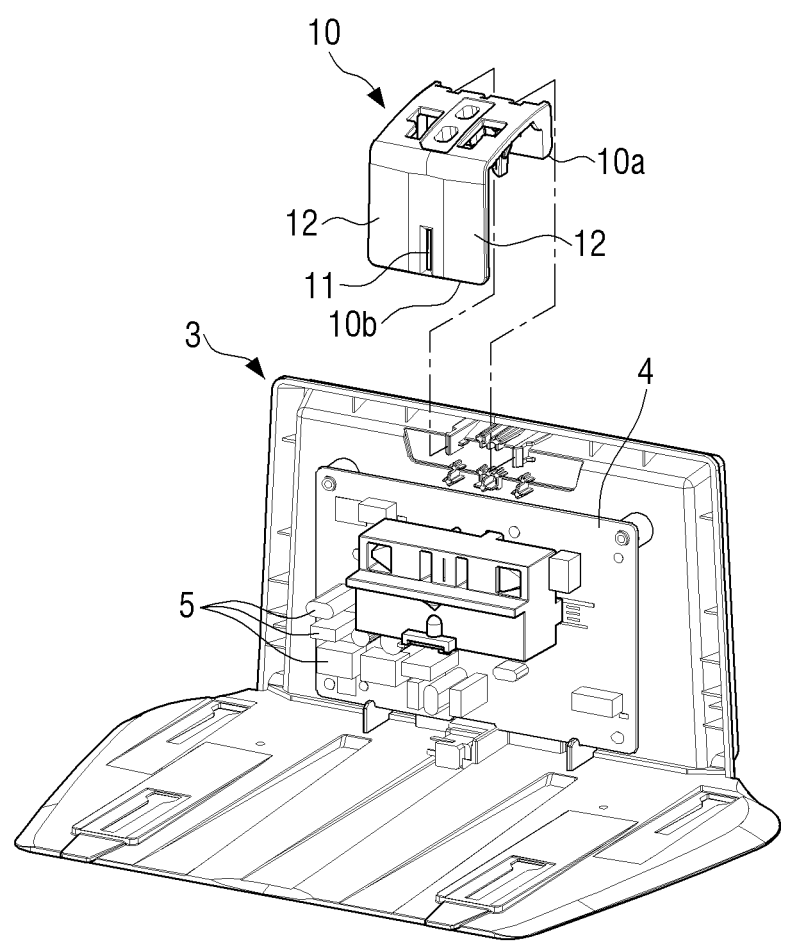
FIG. 3 is an exploded perspective view illustrating a main body and a slit member.

FIG. 3 is an exploded perspective view illustrating a main body 3 and a slit member 10.

The substrate 4 is mounted with various chips 5 of the charging station 1 and the second to fourth light emitting members 7 to 9, which will be described later, and can be coupled to the charging station 1.

The slit member 10 is detachably coupled to the housing 3a of the main body 3, and is disposed in front of a guide member 20 (see FIG. 5), which will be described later, to improve the directivity of the charging signals A (see FIG. 8) emitted from the second to fourth light emitting members 7 to 9 (see FIG. 5).

Specifically, the slit member 10 may be in a "⌐" shape. Accordingly, one end 10a of the slit member 10 may be detachably coupled to the main body 3, and the other end 10b may be located at the front surface of the guide member 20.

The slit member 10 may include a first slit 11 through which a charging signal emitted from the second light emitting member 7 located at a central portion of the substrate 4 passes, and a cover portion 12 disposed around the first slit 11.

The first slit 11 forms a narrow rectangular space, and the infrared signal passing through the first slit 11 can be refracted at a specific angle while passing through the first slit 11, due to the refraction of light.

The light passing through the first slit 11 may have a directivity in a specific direction while maintaining a constant sensitivity.

The cover portion 12 forms an edge of the slit member 10, and may cover a portion of the infrared signal emitted from the third and fourth light emitting members 8 and 9. Accordingly, the infrared signal emitted from the third and fourth light emitting members 8 and 9 does not overlap with the infrared signal emitted from the second light emitting member 7.

In other words, the infrared signal emitted from the second light emitting member 7 is emitted toward the front central portion of the charging station 1, the infrared signal emitted from the third light emitting member 8 is emitted toward a left side of the charging station 1, and the infrared signal emitted from the fourth light emitting member 9 is emitted toward a right side of the charging station 1 in a manner not overlapping with each other.

The robot vacuum cleaner 60 adjacent to the charging station 1 can separately recognize the second to fourth light emitting members 7 to 9 through a sensor (not shown) disposed around the robot vacuum cleaner 60, and the robot vacuum cleaner 60 can be aligned in the charging station 1.

For example, based on the robot vacuum cleaner 60 being located in the left direction of the charging station 1, the robot vacuum cleaner 60 can sense the infrared signal emitted from the third light emitting member 8 and the robot vacuum cleaner 60 can move in the right direction.

Similarly, based on the robot vacuum cleaner 60 being positioned in the right direction of the charging station 1, the robot vacuum cleaner 60 can sense the infrared signal emitted from the fourth light emitting member 9, and the robot vacuum cleaner 60 can move in the left direction.

Based on the robot vacuum cleaner 60 being located in the front direction of the charging station 1, the robot vacuum cleaner 60 can sense the infrared signal emitted from the second light emitting member 7, and the robot vacuum cleaner 60 can move to a portion in which the sensitivity of the sensed infrared signal gets stronger. Accordingly, the robot vacuum cleaner 60 can be aligned in the charging station 1.

Figure 4:
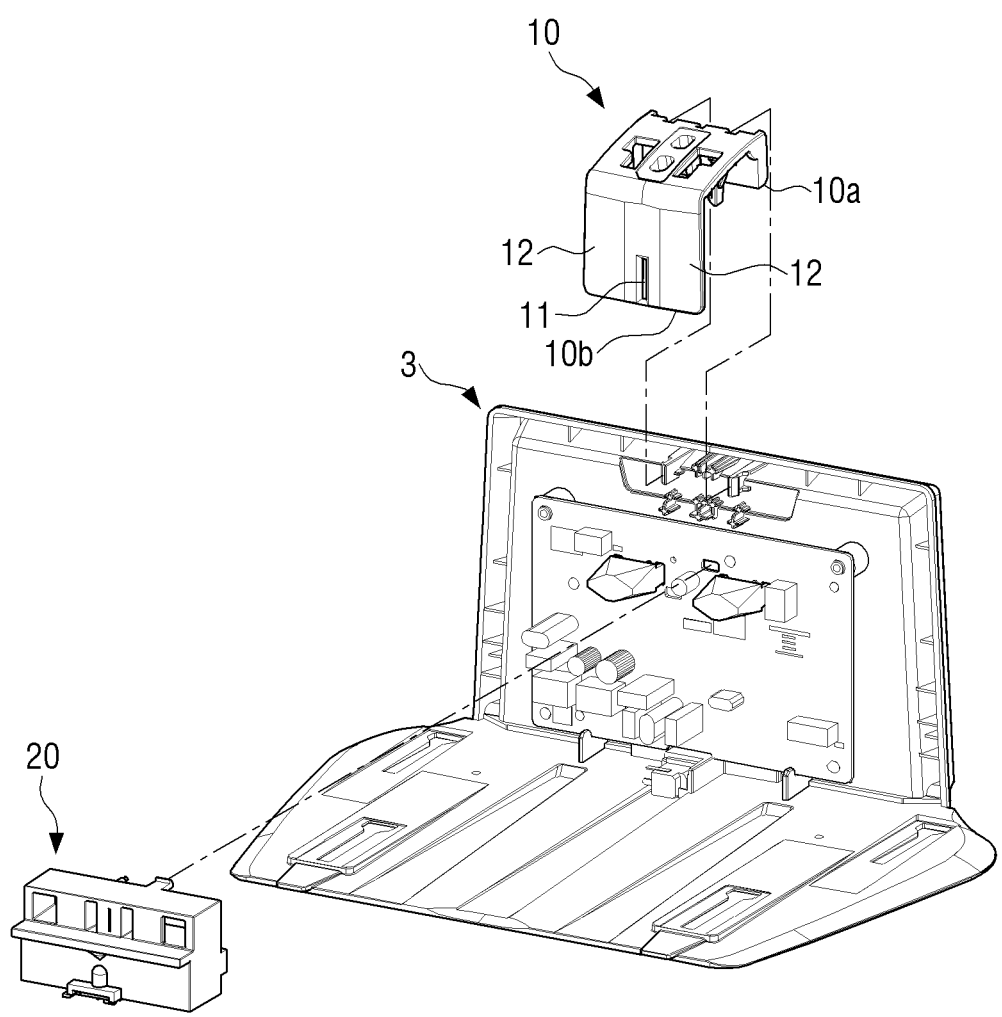
FIG. 4 is an exploded perspective view of the guide member of FIG. 3.
Figure 5:
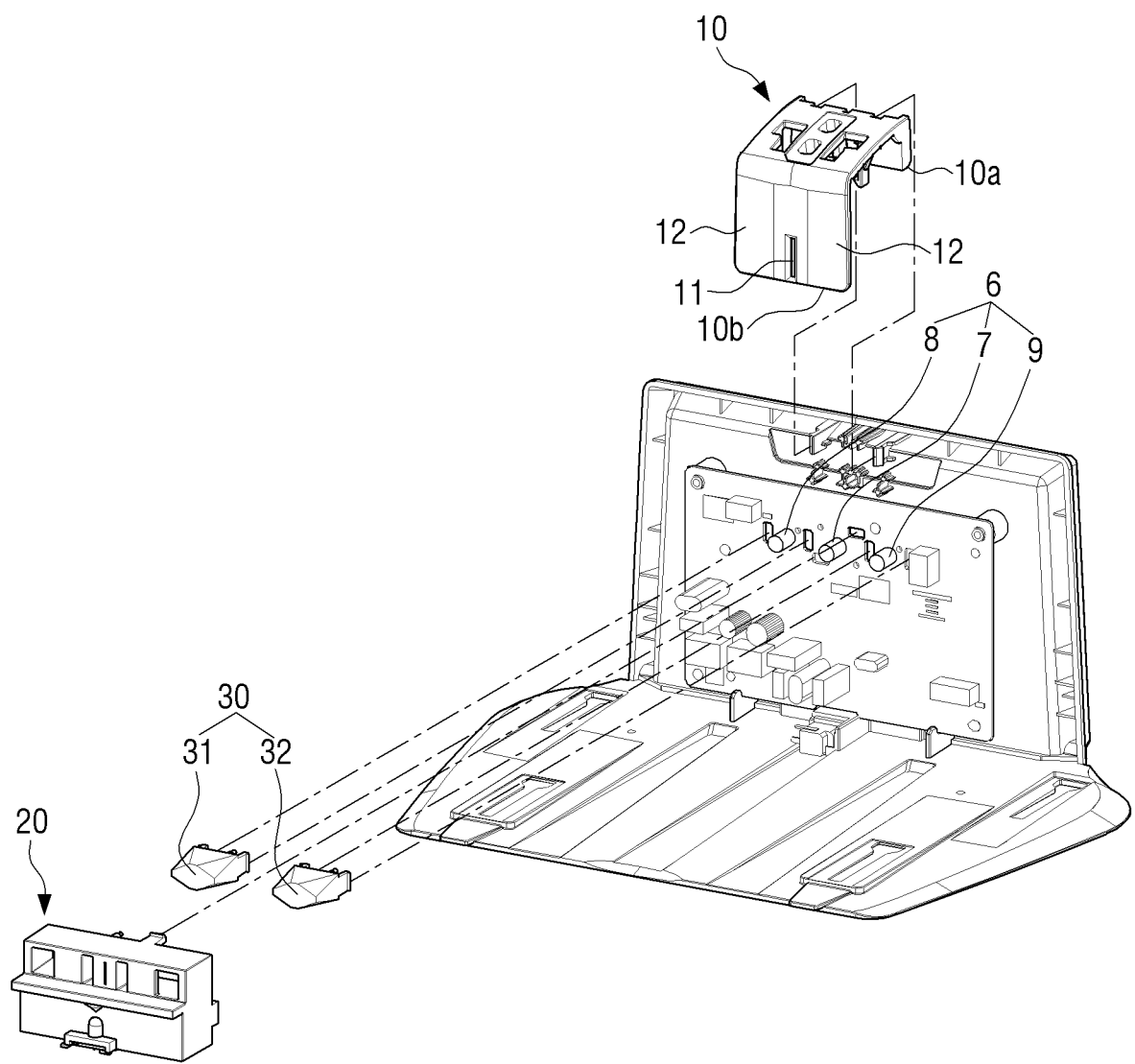
FIG. 5 is an exploded perspective view of a wide-angle member of FIG. 4.

FIG. 4 is an exploded perspective view of the guide member 20 of FIG. 3, FIG. 5 is an exploded perspective view of a wide-angle member 30 of FIG. 4.

The guide member 20 may be disposed in the front of the second to fourth light emitting members 7 to 9 to guide the signal emitted from the second to fourth light emitting members 7 to 9 in a predetermined direction.

The guide member 20 is coupled to the main body 3 and the substrate 4 in a detachable manner. A specific description of the guide member 20 will be described below.

A wide-angle member 30 may be in plural, and each of the wide-angle member 30 may be coupled to the front surfaces of the third and fourth light emitting members 8 and 9, respectively.

Specifically, the wide-angle member 30 may include first and second light-receiving members 31 and 32. The first wide-angle member 31 may be disposed on the front surface of the third light emitting member 8, and the second wide-angle member 32 may be disposed on the front surface of the fourth light emitting member 9.

The wide-angle member 30 can widen an emission angle of the infrared signal emitted from the third and fourth light emitting members 8 and 9 by using the refraction of the light through a prism structure.

The wide-angle member 30 may be made by injection molding and e a wide variety of materials which can widen the emission angle of an infrared signal may be used.

Figure 6:
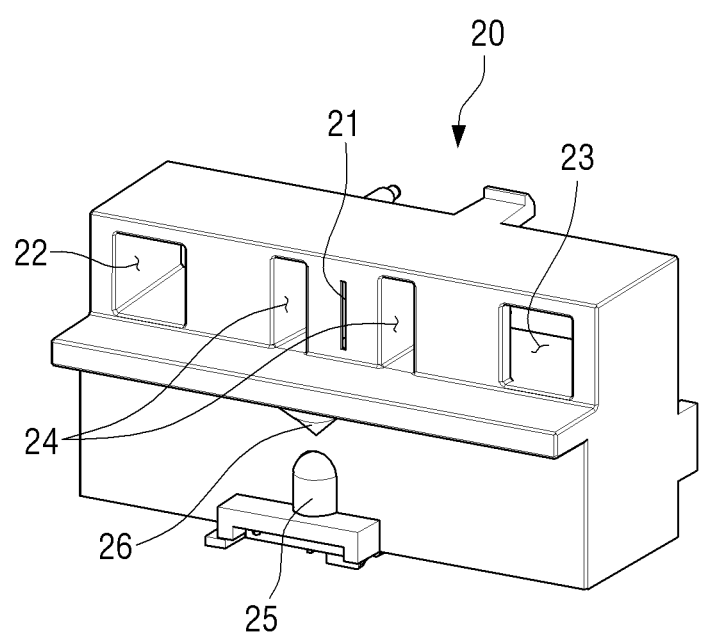
FIG. 6 is an exploded perspective view of the guide member.

FIG. 6 is an exploded perspective view of the guide member 20.

Hereinbelow, referring to FIG. 6, a specific structure of the guide member 20 will be described.

The guide member 20 may receive the first light emitting member 25 and is disposed in front of the second to fourth light emitting members 7 to 9 to guide the signal emitted from the second to fourth light emitting members 7 to 9 in a predetermined direction.

The guide member 20 may include a second slit 21 communicating with the first slit 11, a plurality of openings 22 and 23 communicating with the wide-angle member 30, a connecting portion 24 connecting the slit member 10 and the guide member 20, a first light emitting member 25 emitting an infrared signal, and a reflecting member 26 reflecting the infrared signal emitted from the first light emitting member 25 toward the front direction and the side direction of the charging station 1.

The second slit 21 communicates with the first slit 11. The infrared signal emitted from the second light emitting member 7 may pass through the first slit 11 and the second slit 21 sequentially, and the infrared signal emitted from the second light emitting member 7 may have a directionality having a predetermined sensitivity and emission angle.

The second slit 21 may be formed at the central portion of the guide member 20, but can be formed at various positions of the guide member 20 when communicating with the first slit 11.

The plurality of openings 22 and 23 may be disposed on the front surface of the first and second light emitting members 31 and 32 disposed on the front surface of the third and fourth light emitting members 8 and 9, respectively.

Accordingly, the infrared signal emitted from the third light emitting member 8 may be emitted toward the front left side of the charging station 1 through the first opening 22 of the guide member 20 while passing through the first wide-angle member 31. Similarly, the infrared signal emitted from the fourth light emitting member 9 may be emitted in the front right direction of the charging station 1 through the second opening 23 of the guide member 20, as the emission angle widens while the infrared signal is passing through the second wide-angle member 32.

The shape of the plurality of openings 22, 23 may be rectangular in shape, or may be of a variety of shapes as needed.

The connecting portion 24 may stably fix the position of the slit member 10 and the guide member 20 by connecting the slit member 10 and the guide member 20. Even when the infrared signal emitted from the second to fourth light emitting members 7, 8, and 9 sequentially passes through the guide member 20 and the slit member 10, the emitted infrared signal can be stably emitted to the outside of the charging station 1 through the guide member 20 and the slit member 10.

The first light emitting member 25 may emit an infrared signal. However, the first light emitting member 25 may emit signals of various wavelengths as necessary.

When the robot vacuum cleaner 60 performs cleaning, the first light emitting member 25 may emit the safe signal B to a predetermined radius with respect to the charging station 1, and the robot vacuum cleaner 60, which detects the safe signal B, may not collide with the charging station 1.

Even when the robot vacuum cleaner 60 approaches the charging station 1 for charging, the first light emitting member 25 may emit the same safe signal B to a predetermined radius on the basis of the charging station 1. However, when the robot vacuum cleaner 60 accessing the charging station 1 detects the safe signal B, the safe signal B can be used as the information for calculating the distance with the charging station 1.

The safe signal B emitted from the first light emitting member 25 emits the same signal, but the robot vacuum cleaner 60, which senses the same, can use the safe signal B as information to control the robot vacuum cleaner 60 in a different manner in accordance with the cleaning step and the charging step of the robot vacuum cleaner 60.

The first light emitting member 25 is accommodated in the guide member 20 so that a part of the surface of the first light emitting member 25 is covered on the front surface of the guide member 20 and the other surface of the first light emitting member 25 is exposed to the front of the charging station 1.

The first light emitting member 25 may be disposed vertically on the substrate 4 coupled to the inside of the housing 3a so as to be perpendicular to the second to fourth light emitting members 7, 8, and 9 emitting a signal toward the front of the charging station 1.

That is, the second to fourth light emitting members 7, 8, and 9 can be arranged to be perpendicular to the front surface 2a and the substrate 4 of the cover 2, and the first light emitting member 25 can be arranged to be parallel to the front surface 2a and the substrate 4 of the cover 2.

Accordingly, the infrared signal emitted from the second to fourth light emitting members 7, 8, and 9 disposed perpendicular to the front surface 2a of the cover 2 has a limitation in a radial angle that is widen through the first and second slits 11 and 21 and the wide-angle member 30. However, since the infrared signal emitted from the first light emitting member disposed perpendicular to the front surface 2a of the cover 2 is reflected by the reflecting member 26, it is possible to realize a wide radiation angle including the front and the side of the charging station 1.

The light emitting structure of the first light emitting member 25 may be the same as the second to fourth light emitting members 7, 8, and 9. Accordingly, the manufacturing cost of the charging station 1 can be reduced by using the same first light emitting member 25 as the second to fourth light emitting members 7, 8, and 9 without the need to manufacture a separate first light emitting member 25.

The reflecting member 26 may be disposed to face the first light emitting member 25 and may reflect the infrared signal emitted from the first light emitting member 25 toward the front and the side of the charging station 1.

Figure 10:
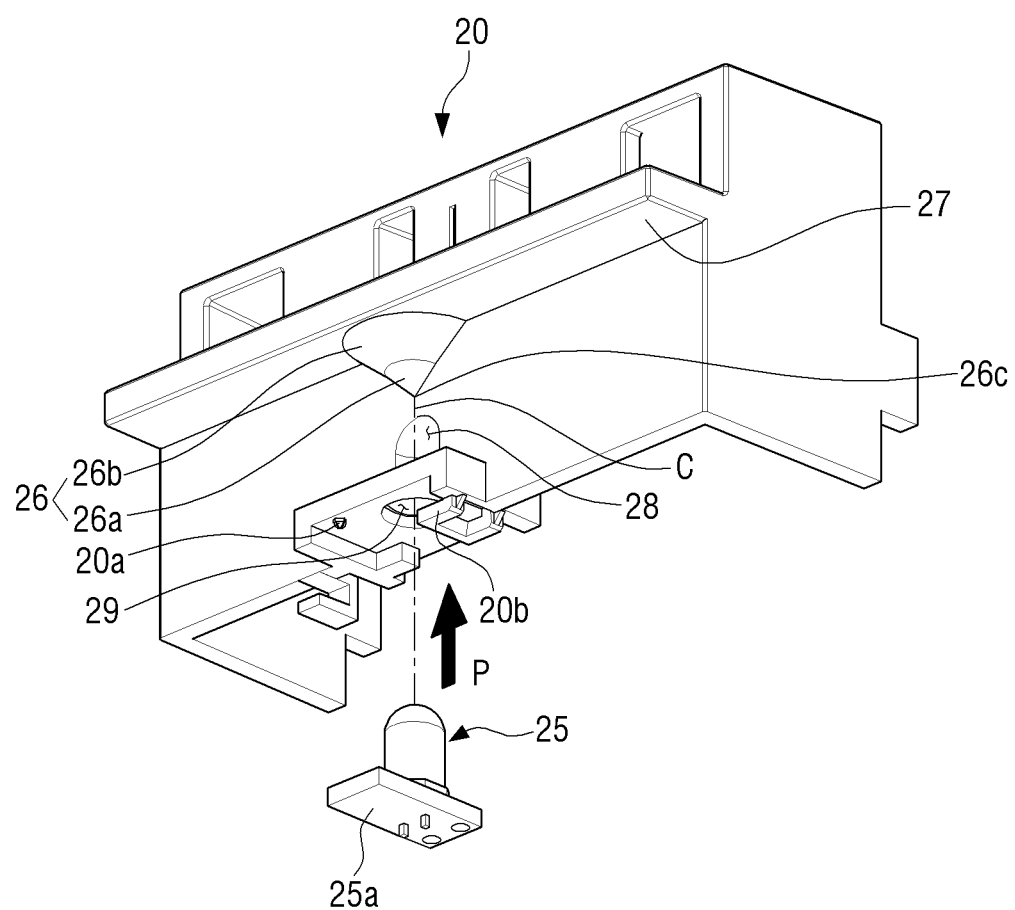
FIG. 10 is a bottom exploded perspective view illustrating the guide member and the first light emitting member.

Referring to FIG. 10, the reflecting member 26 may be in a conical shape, and a vertex of the reflecting member 26 may be disposed to coincide with a central axis C of the first light emitting member 25.

Accordingly, the reflecting member 26 and the first light emitting member 25 can be accurately aligned. Also, the infrared signal can be emitted to the outside of the charging station 1 at a predetermined sensitivity and a preset emission angle without leaning of the infrared signal in one direction of the charging station 1.

The reflecting member 26 may also include only a conical portion in one direction with respect to a cross-section including the central axis C in the cone, rather than a complete cone. The reflecting member 26 may include only a three-dimensional shape of the cone with respect to the central axis C.

The shape of the reflecting member 26 is a conical shape, but the shape is sufficient if the reflecting member 26 includes a curved surface and may reflect the infrared signal emitted from the first light emitting member 25 at a predetermined angle.

The reflecting member 26 may be a polygonal shape. In this case, the reflecting member 26 may include only a polygonal portion in one direction with respect to the cross-section including the central axis C in the polygon, rather than a complete polygon. That is, the reflecting member 26 may include only a three-dimensional shape of the polygon of 180 degrees with respect to the central axis C.

Accordingly, the infrared signal B emitted from the first light emitting member 25 may be reflected to the reflecting member 26, so that the infrared signal B may be emitted to the side as well as the front of the charging station 1. The emission angle of the infrared signal B emitted from the first light emitting member 25 may be adjusted according to the shape of the reflecting member 26 and may have an emission angle of 180 degrees.

Figure 9:
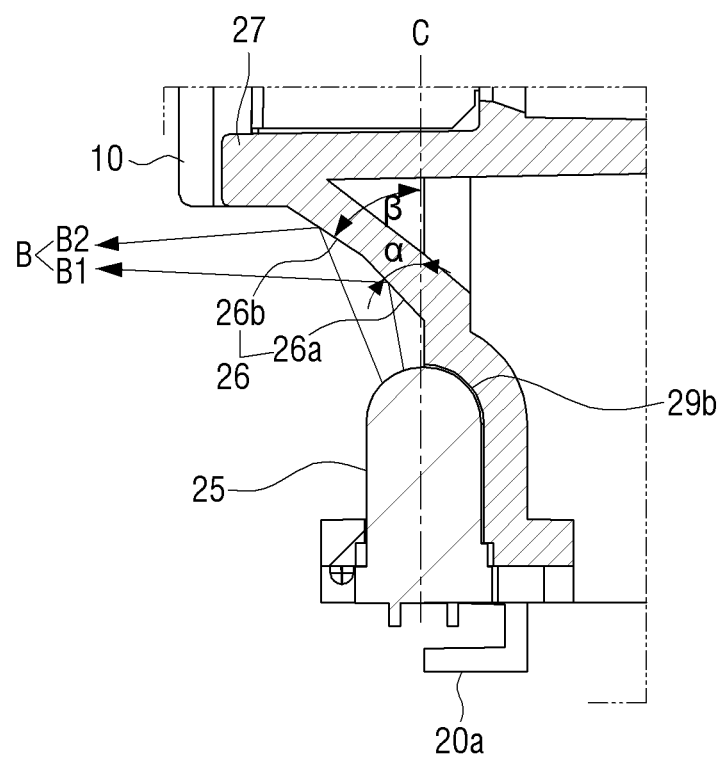
FIG. 9 is an enlarged view of the IX portion of FIG. 8.

In addition, as illustrated in FIG. 9, the reflecting surface of the reflecting member 26 may include a first reflecting surface 26a and a second reflecting surface 26b in which cross-sections including the central axis C have a form of a broken line with different slopes with respect to the central axis.

The first reflective surface 26a may have a first slope $\alpha$ with respect to the central axis C, and the second reflection surface 26b may have a second slope $\beta$ with respect to the central axis C. The reflecting surface of the reflecting member 26 may be formed such that the cross-section including the central axis C has the first to second slopes $\alpha$, $\beta$. That is, the side of the reflecting member 26 may be in the shape of a cone or polygon having a dual slope.

In addition, the second reflection surface 26b located farther than the first reflection surface 26a with respect to the first light emitting member 25 may have a greater slope than the first reflection surface 26a with respect to the central axis C.

As illustrated in FIG. 9, the second slope $\beta$ located farther than the first slope $\alpha$ with respect to the first light emitting member 25 may be larger than the first slope $\alpha$ with respect to the central axis C.

Accordingly, the first infrared signal B1 emitted from the first light emitting member may be reflected from the reflecting surface of the reflecting member 26 having the first slope $\alpha$ and emitted toward the front, and the second infrared signal B2 emitted from the first light emitting member 25 may be reflected by the reflecting surface of the reflecting member 26 having a second slope $\beta$ greater than the first slope $\alpha$, and may be emitted toward the front.

The reflecting member 26 may further refract and reflect the infrared signal B so that the infrared signal B reflected from the reflecting member 26 may not overlap with the infrared signal A emitted from the second to fourth light emitting members 7, 8, and 9 through a dual slope structure having a second slope $\beta$ greater than the first slope $\alpha$.

The reflection surface of the reflecting member 26 is sufficient if the infrared signal can be reflected without being transmitted, and can be injection molded or surface treated with chromium, aluminum plating on the reflection surface as needed.

The reflecting member 26 may be coupled with the guide member 20 as a separate member.

The reflecting member 26 may be integrally formed with a protrusion 27 (see FIG. 10) protruding along the front surface of the guide member 20.

The reflecting member 26 may be integrally formed with a surface facing the first light emitting member 25 of the protrusion 27. Accordingly, since there is no need to manufacture a separate reflecting member 26, a manufacturing cost and manufacturing process of the charging station 1 can be reduced.

Figure 7:
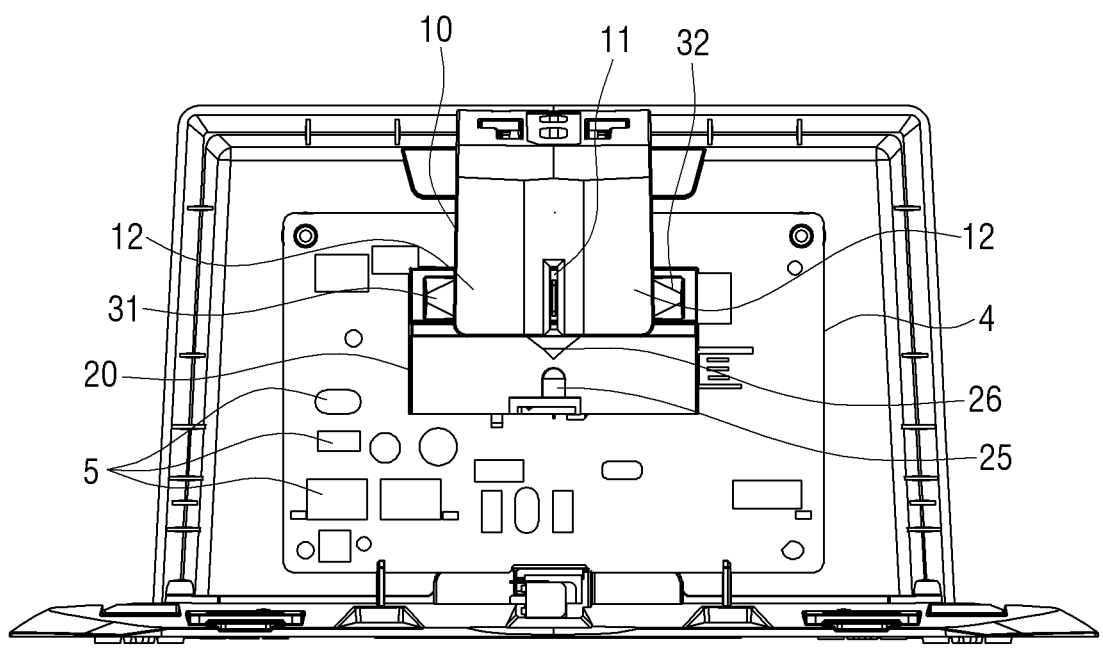
FIG. 7 is a front view seen from the direction of VII of FIG. 2.
Figure 8:
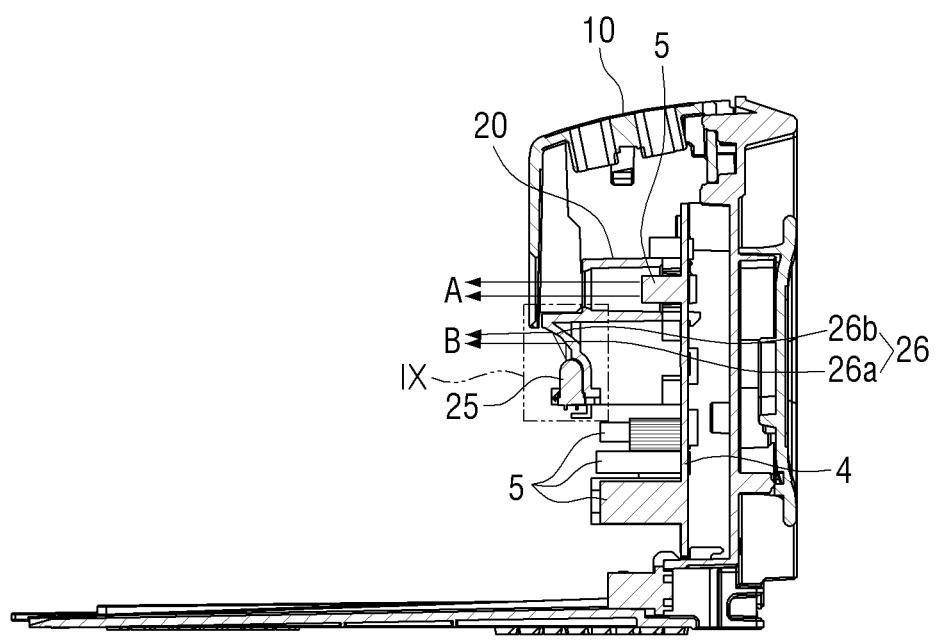
FIG. 8 is a cross-sectional view taken along Y-Y of FIG. 2.

FIG. 7 is a front view seen from the direction of VII of FIG. 2, FIG. 8 is a cross-sectional view taken along the line Y-Y of FIG. 2, and FIG. 9 is an enlarged view of the IX portion of FIG. 8.

Hereinafter, the operation of one embodiment according to the disclosure will be described in detail with reference to FIGS. 7 to 9.

Referring to FIG. 7, the infrared signal emitted from the second light emitting member 7 may sequentially pass through the second slit 21 of the guide member 20 and the first slit 11 of the slit member 10, and may be emitted to the front central portion of the charging station 1.

The infrared signal emitted from the third light emitting member 8 may pass through the first wide-angle member 31, and the portion near the first slit 11 of the infrared signal emitted from the third light emitting member 8 may be partially covered by the cover portion 12 of the slit member 10. Accordingly, the infrared signal emitted from the third light emitting member 8 may be emitted to the front left side of the charging station 1, and the infrared signal emitted from the second light emitting member 7 may not overlap with the infrared signal emitted from the second light emitting member 7.

Similarly, the infrared signal emitted from the fourth light emitting member 9 may pass through a second wide-angle member 32, and the portion near the first slit 11 of the infrared signal emitted from the fourth light emitting member 9 may be partially covered by the cover portion 12 of the slit member 10. Accordingly, the infrared signal emitted from the fourth light emitting member 9 may be emitted to the front right portion of the charging station 1, and the infrared signal emitted from the second light emitting member 7 may not overlap with the infrared signal emitted from the second light emitting member 7.

Referring to FIGS. 8 to 9, the infrared signal B emitted from the first light emitting member 25 may be reflected by the reflecting member 26 and may be emitted to the front and the left or right sides of the charging station 1.

The infrared signal B emitted from the first light emitting member 25 and the infrared signal A emitted from the second to fourth light emitting members 7, 8 and 9 may be divided by a protrusion 27 (see FIG. 10) protruding along the front surface of the guide member 20.

In other words, the infrared signal B emitted from the first light emitting member 25 and the infrared signal A emitted from the second to fourth light emitting members 7, 8, and 9 may be physically divided without overlapping by the protrusion 27 formed along the front surface of the guide member 20.

Accordingly, a plurality of sensors (not shown) disposed along the side edges of the robot vacuum cleaner 60 can separately detect the infrared signal B emitted from the first light emitting member 25 and the infrared signal A emitted from the second to fourth light emitting members 7, 8, and 9.

The surface adjacent to the first light emitting member 25 of the protrusion 27 may be formed of a material that absorbs the infrared signal, except for the portion where the reflecting member 26 is formed, or may be formed as a non-homogeneous surface to induce diffused reflection of light.

Accordingly, the protrusion 27 can absorb infrared signals that are not reflected by the reflecting member 26 among the infrared signals B emitted from the first light emitting member 25 or reduce the sensitivity of the infrared signal through diffuse reflection. Thus, the protrusion 27 can prevent interference between unnecessary signals and the infrared signal B of the forward facing first light emitting member 25.

The protrusion 27 allows the infrared signal B emitted from the first light emitting member 25 and the infrared signal A emitted from the second to fourth light emitting members 7, 8, and 9 do not interfere with each other and are simultaneously emitted.

Figure 11:
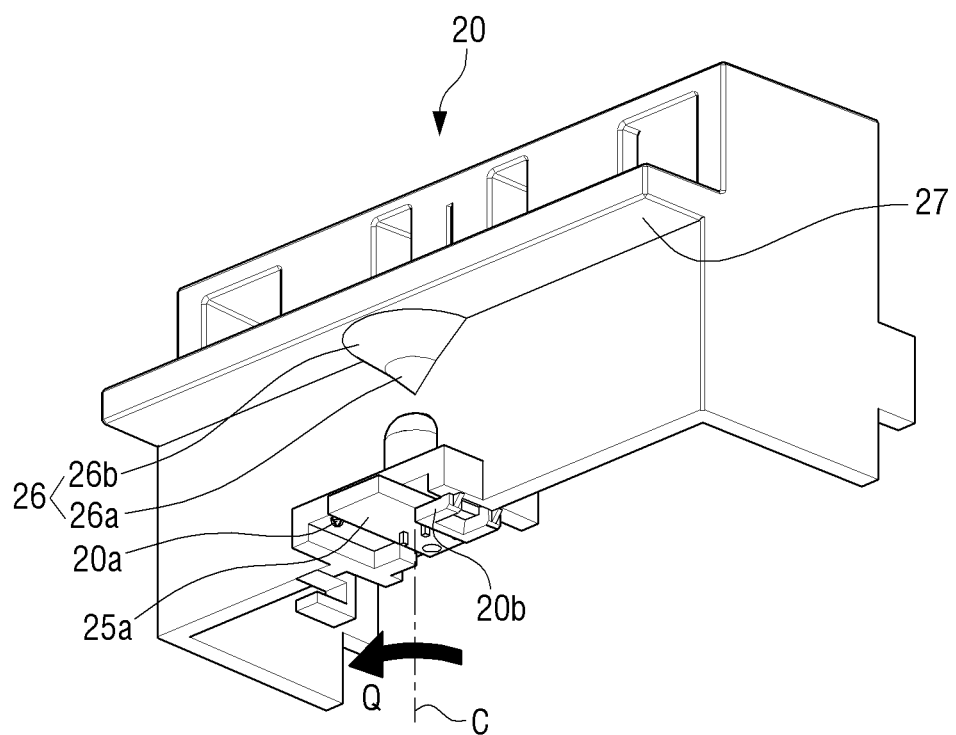
FIG. 11 is a bottom perspective view of the first light emitting member being inserted into the guide member.
Figure 12:
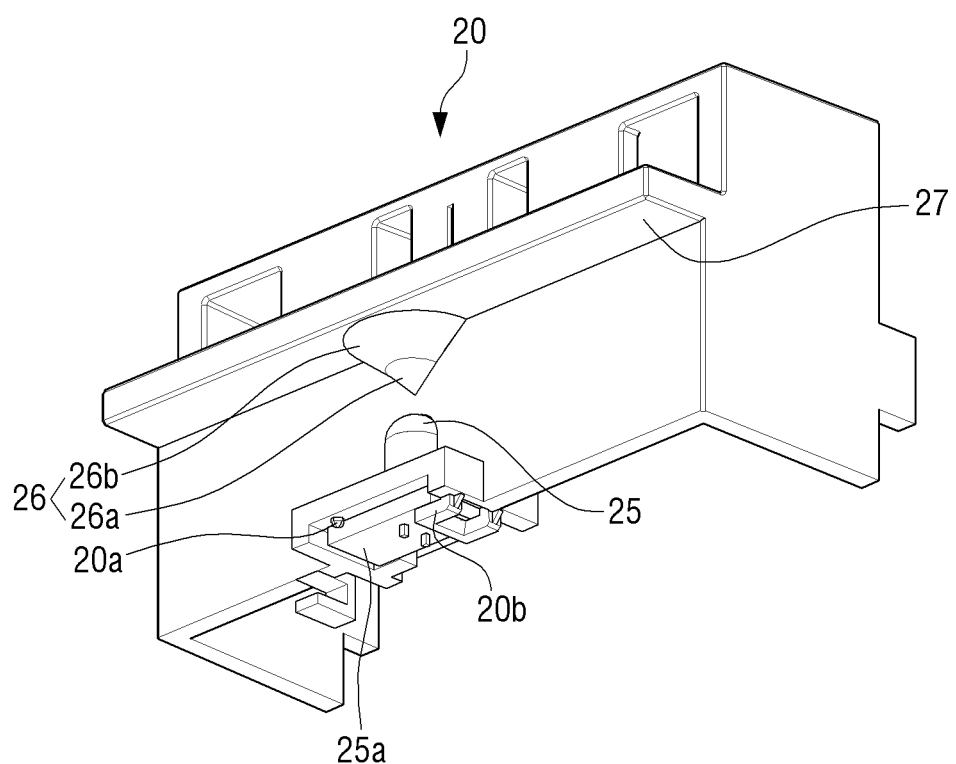
FIG. 12 is a bottom perspective view illustrating the first light emitting member being fixed to the guide member.

FIG. 10 is a bottom exploded perspective view illustrating the guide member 20 and the first light emitting member 25, FIG. 11 is a bottom perspective view of the first light emitting member 25 inserted into the guide member 20, and FIG. 12 is a bottom perspective view illustrating the first light emitting member 25 fixed to the guide member 20.

Hereinafter, a structure for inserting the first light emitting member 25 into the guide member 20 will be described with reference to FIGS. 10 to 12.

Referring to FIG. 10, the guide member 20 may include a receiving portion 28 in which a first light emitting member 25 is received, and fixing members 20a and 20b for fixing the first light emitting member 25 to the receiving portion 28.

The receiving portion 28 is a space formed in the guide member 20, is connected to an insertion hole 29 formed on a lower surface of the guide member 20, and may include a cover surface 29b (see FIG. 9) covering a portion of the surface of the first light emitting member 25.

The insertion hole 29 is an opening into which the first light emitting member 25 is inserted, and is formed with a diameter such that the first light emitting member 25 can be inserted.

The cover surface 29b may cover a portion of the surface of the first light emitting member 25 and may be in a shape to surround the outer surface of the first light emitting member 25. The cover surface 29b may be formed adjacent to the first light emitting member 25 in a shape corresponding to the first light emitting member 25.

Accordingly, the cover surface 29b may absorb the infrared signal emitted from the first light emitting member 25 toward the cover surface 29b or reduce the sensitivity of the infrared signal through diffused reflection, thereby preventing the infrared signal emitted to the rear side of the first light emitting member 25 from being directed in a front direction.

The cover surface 29b may be formed of a material that absorbs an infrared signal, or may be formed of a non-homogeneous surface to induce diffuse reflection of light.

The fixing members 20a and 20b can stably fix the first light emitting member 25 inserted through the insertion hole 29. The fixing members 20a and 20b may include a fixing protrusion 20a protruding at the lower surface of the guide member 20 and an interference protrusion 20b interfering with the supporting portion 25a of the first light emitting member 25.

The fixing protrusion 20a may contact the side surface of the support portion 25a of the first light emitting member 25 in a fixed state to prevent the support portion 25a of the first light emitting member 25 from rotating in an opposite direction.

The interference protrusion 20b may contact the lower surface of the support portion 25a of the first light emitting member 25 in a fixed state to prevent the first light emitting member 25 from escaping from the insertion hole 29.

Hereinafter, a method of manufacturing the charging station 1 in which the first light emitting member 25 is inserted into the guide member 20 will be described with reference to FIGS. 10 to 12.

The first light emitting member 25 emitting the infrared signal B may be aligned in the receiving portion 28 of the guide member in which the first light emitting member 25 is inserted.

Thereafter, the aligned first light emitting member 25 may be communicated with the receiving portion 28 and inserted into the receiving portion 28 along a P direction through the insertion hole 29 formed on the lower surface of the guide member 20.

The first light emitting member 25 inserted into the receiving portion 28 may be rotated in a predetermined direction (Q direction) to couple the first light emitting member 25 to the fixing members 20a and 20b formed on the guide member 20.

As illustrated in FIG. 12, the side surface of the support portion 25a of the first light emitting member 25 may interfere with the fixing protrusion 20a of the fixing member, and the lower surface of the support portion 25b of the first light emitting member 25 may contact and interfere with the interference protrusion 20b, and may be stably fixed.

Accordingly, the first light emitting member 25 can be easily coupled to the guide member 20, and accurate alignment of the first light emitting member 25 and the reflecting member 26 can be implemented.

Figure 13A:
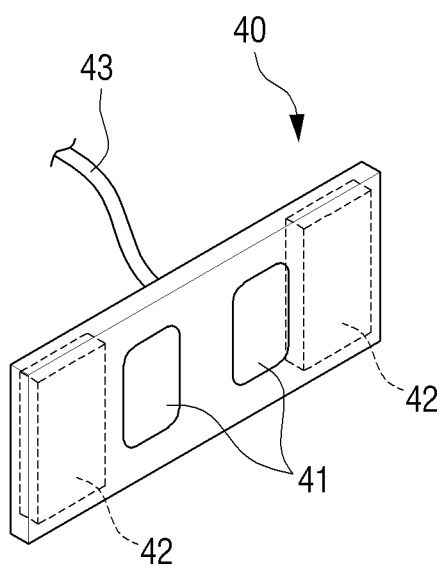
FIG. 13A is a perspective view illustrating a charging member of a charging station.
Figure 13B:
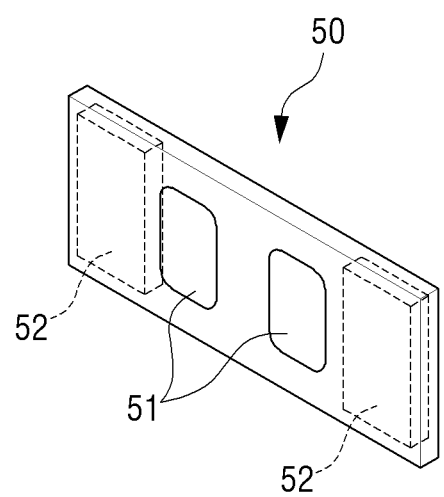
FIG. 13B is a perspective view illustrating a charging unit of a robot vacuum cleaner.
Figure 14:
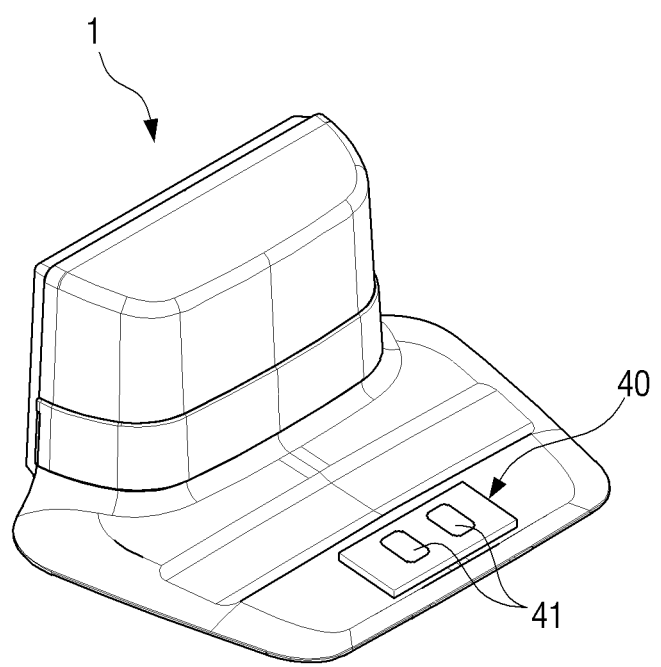
FIG. 14 is a perspective view in which a charging member is coupled with a charging station.

FIG. 13A is a perspective view illustrating the charging member 40 of the charging station 1, FIG. 13B is a perspective view illustrating the charging unit 50 of the robot vacuum cleaner 60, FIG. 14 is a perspective view in which the charging member 40 is coupled with the charging station 1, and FIG. 15 is a perspective view in which the charging unit 50 is coupled with the robot vacuum cleaner 60.

Hereinafter, a charging member 40 of the charging station 1 and a charging unit 50 of the robot vacuum cleaner 60 will be described with reference to FIGS. 13A to 15.

The charging station 1 may include the charging member 40 that can move flexibly with respect to the fixed charging station 1.

The charging member 40 may include a charging terminal 41 connected to an external power source (not shown) and at least one magnetic body 42 disposed around the charging terminal 41, and a wire 43.

The charging terminal 41 may be in contact with the charging terminal 51 of the robot vacuum cleaner 60 and charge a battery (not shown) of the robot vacuum cleaner 60.

The charging terminal 41 may have a shape corresponding to the charging terminal 51 of the robot vacuum cleaner 60. Also, the charging terminal 41 can be formed larger than the charging terminal 51 of the robot vacuum cleaner 60. Accordingly, even if there is an error of the charging terminal 51 of the robot vacuum cleaner 60 not completely coming in contact with the charging terminal 41 of the charging station 1, the robot vacuum cleaner 60 can be charged.

The magnetic body 42 may contact the charging portion 50 of the robot vacuum cleaner 60 with the charging member 40 of the charging station 1. Specifically, the magnetic body 42 may have a certain magnetic property and can be in contact with a magnetic body 52 of the robot vacuum cleaner 60 having the opposite polarity to the magnetic body 42 due to magnetic force.

For example, if the magnetic body 42 of the charging member 40 is positive (+) polarity, the magnetic material 52 of the charging unit 50 may be negative (−) polarity, and when the magnetic body 42 of the charging member 40 is negative (−) polarity, the magnetic material 52 of the charging unit 50 may be positive (+) polarity.

The magnetic body 42 may be disposed within the charging member 40 and may be disposed around the charging terminal 51.

The magnetic body 42 may include an electromagnet, and the charging station 1 may include a processor (not shown) for adjusting the magnetization of the electromagnet by controlling the current supplied to the electromagnet.

The electromagnet is magnetized when a current flows in a conducting wire and is not magnetized when the current is cut off, and can be composed of a solenoid. The electromagnet will be obvious to a person skilled in the art in the technical field, and thus a detailed description thereof will be omitted.

In the event that the robot vacuum cleaner 60 is positioned adjacent to the charging member 40 of the charging station 1 for charging, the processor can supply current to the electromagnet and magnetize the electromagnet to cause the charging member 40 move and contact the charging portion 50 of the robot vacuum cleaner 60.

In addition, when charging of the robot vacuum cleaner 60 is completed, the processor may stop supplying current to the electromagnet and remove magnetization of the electromagnet so that the charging member 40 is separated from the charging unit 50 of the robot vacuum cleaner 60.

The electric wire 43 can connect the charging member 40 and the main body 3 of the charging station 1, and can supply power to the charging member 40. Accordingly, even if the charging member 40 is separated from the main body 3 and moves, power can still be supplied to the charging member 40 by the electric wire 43.

Referring to FIG. 13B, the charging unit 50 of the robot vacuum cleaner 60 is fixedly disposed outside the robot vacuum cleaner 60.

The charging unit 50 may include a magnetic body 52 and a charging terminal 51 contacting the charging terminal 41 of the charging member 40. The charging terminal 51 and the magnetic body 52 of the charging unit 50 are configurations corresponding to the charging terminal 41 and the magnetic body 52 of the charging member 40 and an overlapped description will be omitted.

Referring to FIGS. 14 through 15, the charging member 40 may be disposed on the outer surface of the charging station 1, and the charging unit 50 may be disposed on the outer surface of the robot vacuum cleaner 60.

Figure 16:
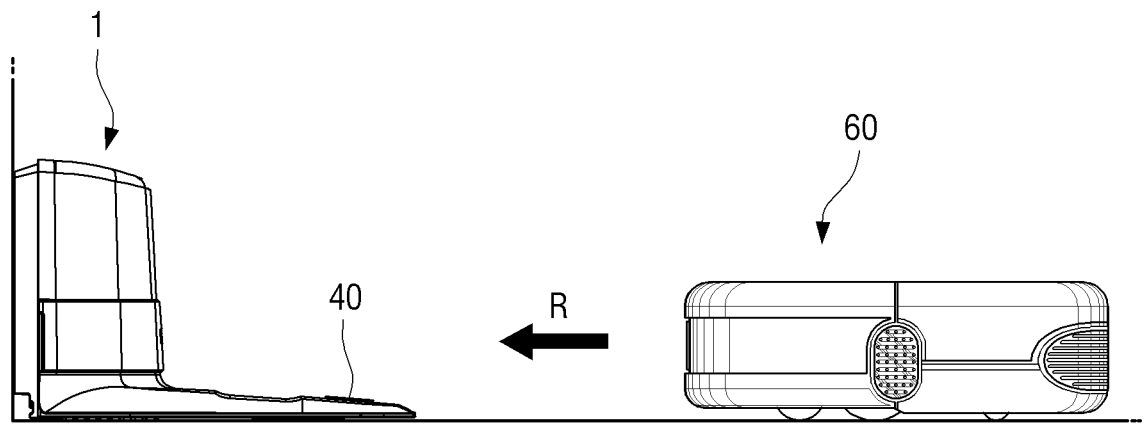
FIG. 16 is a view illustrating a state in which a robot vacuum cleaner moves toward a charging member.
Figure 17:
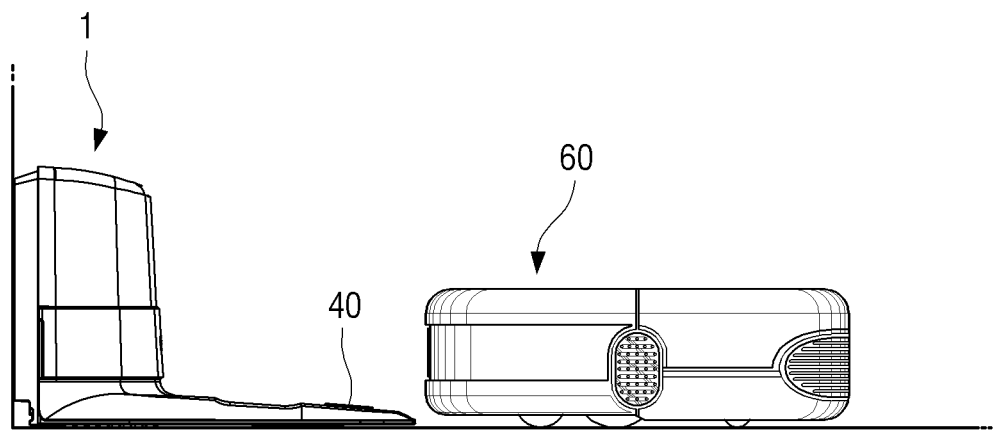
FIG. 17 is a view illustrating a state that the robot vacuum cleaner is positioned adjacent to the charging member.
Figure 18:
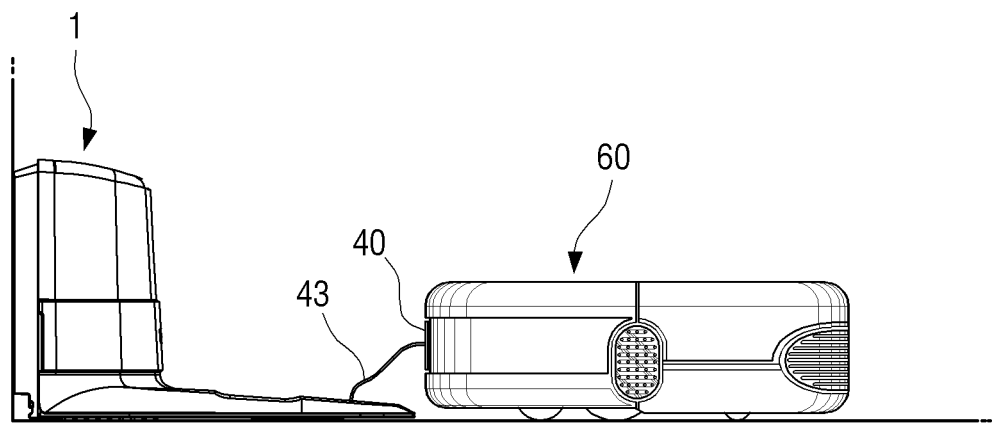
FIG. 18 is a view illustrating a state in which a charging member is coupled with a charting unit of the robot vacuum cleaner according to a movement of the robot vacuum cleaner.

FIGS. 16 to 18 are views illustrating a process in which the charging member 40 is coupled with the charging unit 50 of the robot vacuum cleaner 60 according to a movement of the robot vacuum cleaner 60.

Hereinafter, a charging process of the robot vacuum cleaner 60 according to the movement of the robot vacuum cleaner 60 will be described with reference to FIGS. 16 to 18.

First, as shown in FIG. 16, the robot vacuum cleaner 60 which operated for a predetermined time can move (in an R direction) to the charging station 1 for charging.

After the robot vacuum cleaner 60 is positioned adjacent to the charging station 1, the magnetic body 42 of the charging member 40 may move to the charging unit 50 of the robot vacuum cleaner 60 by the magnetic force so that the charging member 40 can contact the magnetic body 52 of the robot vacuum cleaner 60.

When the magnetic body 42 is an electromagnet, the processor may supply a current to the magnetic body 42 and magnetize the magnetic body 42 to have a polarity opposite to the magnetic material 52 of the robot vacuum cleaner 60.

As illustrated in FIG. 18, the charging member 40 of the charging station 1 may come into contact with the charging unit 50 of the robot vacuum cleaner 60, and the robot vacuum cleaner 60 can be charged.

Accordingly, even when the robot vacuum cleaner 60 is not correctly aligned with the charging station 1, the charging member 40 can be flexibly moved in the direction of the charging station 1 so that charging of the robot vacuum cleaner 60 can be easier and charging convenience can be improved.

While the various embodiments have been described above separately, each of the embodiments is not necessarily to be taken alone, and the configuration and operation of each of the embodiments may be implemented in combination with at least one other embodiment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A charging station supplying power to a robot vacuum cleaner, comprising:
   a charging member configured to come into contact with a charging terminal of the robot vacuum cleaner to provide power to the charging terminal;
   a first light emitting member for emitting an infrared signal;
   a reflecting member disposed to face the first light emitting member and reflect an infrared signal emitted from the first light emitting member, toward front and sides of the charging station,
   a housing;
   a second light emitting member disposed vertically on a substrate coupled to an inside of the housing for emitting an infrared signal toward a front of the charging station; and
   a guide member disposed on a front of the second light emitting member for guiding a signal transmitted from the second light emitting member in a predetermined direction,
   wherein the first light emitting member is received in the guide member.

2. The charging station of claim 1, wherein the reflecting member is in a conical shape, and
   wherein a vertex of the reflecting member is disposed to coincide with a central axis of the first light emitting member.

3. The charging station of claim 2, wherein a reflecting surface of the reflecting member comprises a cross-section crossing the central axis including a broken line with slopes of a first slope and a second slope,
   wherein a portion of the broken line with the second slope is located farther than a portion of the broken line with the first slope with respect to the first light emitting member and
   wherein the second slope is greater than the first slope with respect to the central axis.

4. The charging station of claim 1, wherein the guide member comprises a protrusion which protrudes along a front of the guide member and partitions an infrared signal emitted from a first light emitting member and an infrared signal emitted from a second light emitting member.

5. The charging station of claim 4, wherein the reflecting member is integrally formed with a surface facing the first light emitting member of the protrusion.

6. The charging station of claim 1, wherein the guide member comprises a receiving portion in which the first light emitting member is received, and
   wherein the receiving portion comprises a cover surface covering a portion of the first light emitting member.

7. The charging station of claim 6, wherein the receiving portion is connected to an insertion hole formed on a lower surface of the guide member, and the first light emitting member is inserted into the receiving portion through the insertion hole.

8. The charging station of claim 6, wherein the guide member comprises a fixing member for fixing the first light emitting member to the receiving portion.

9. The charging station of claim 1, wherein the charging member comprises:
   a charging terminal; and
   a magnetic body.

10. The charging station of claim 9, wherein the magnetic body comprises an electromagnet,
    wherein the charging station further comprises a processor for adjusting magnetization of the electromagnet by controlling current supplied to the electromagnet, and
    wherein the processor is configured to, based on the robot vacuum cleaner being positioned adjacent to the charging member for charging, supply current to the electromagnet to magnetize the electromagnet, and based on charging of the robot vacuum cleaner being completed, stop supplying current to the electromagnet and remove magnetization of the electromagnet.

11. The charging station of claim 1, wherein the reflecting member is in a polygonal shape, and
    wherein a vertex of the reflecting member is disposed to coincide with a central axis of the first light emitting member.

12. A method of manufacturing a charging station, the method comprising:
    aligning a first light emitting member emitting an infrared signal in a receiving portion of a guide member into which the first light emitting member is inserted;
    communicating the first light emitting member with the receiving portion and inserting the light emitting member into the receiving portion through an insertion hole formed on a lower surface of the guide member; and
    coupling the first light emitting member to a fixing member formed on the guide member by rotating the first light emitting member in a predetermined direction.

* * * * *